(12) United States Patent
Arndt et al.

(10) Patent No.: US 9,767,696 B2
(45) Date of Patent: Sep. 19, 2017

(54) METHOD FOR LOCATING AN OBJECT IN A BLIND-SPOT OF A VEHICLE

(71) Applicant: FORD GLOBAL TECHNOLOGIES, LLC, Dearborn, MI (US)

(72) Inventors: Christoph Arndt, Moerlen (DE); Sabine Notelaers, Limburg (BE); Jitendra Shah, Kolkata West Bengal (IN); Peter W. A. Zegelaar, Heerlen (NL)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 14/661,011

(22) Filed: Mar. 18, 2015

(65) Prior Publication Data

US 2015/0269844 A1    Sep. 24, 2015

(30) Foreign Application Priority Data

Mar. 18, 2014  (DE) .................. 10 2014 205 014

(51) Int. Cl.
*G08G 1/16*     (2006.01)
*G08G 1/052*    (2006.01)

(52) U.S. Cl.
CPC ........... *G08G 1/167* (2013.01); *G08G 1/052* (2013.01); *G08G 1/166* (2013.01); *B60R 2300/802* (2013.01)

(58) Field of Classification Search
CPC ........ G08G 1/166; G08G 1/167; G08G 1/165; G08G 1/052; G08G 1/096783;

(Continued)

(56) References Cited

U.S. PATENT DOCUMENTS 8,493,195 B2    7/2013  Lee
2006/0055525 A1*  3/2006  Kubota ............... G08G 1/0962
                                                        340/461

(Continued)

FOREIGN PATENT DOCUMENTS

DE    102006047634 A1    4/2008
DE    102011010864 A1    12/2011
JP     EP 2803546 A1 * 11/2014  ........... B60W 50/04

OTHER PUBLICATIONS

JP 2013-102315, Minemura Akinori, May 14, 2013, Denso Corp, Publication No. JP 2014-222462, p. 1.*

(Continued)

*Primary Examiner* — Mirza Alam
(74) *Attorney, Agent, or Firm* — Frank MacKenzie; Brooks Kushman P.C.

(57) ABSTRACT

A method for detecting moving objects in the area surrounding a vehicle by means of a vehicle-mounted sensor system having separate detection zones between which there is at least one detection gap. A crossover of an object between two detection zones across a detection gap is bridged by prediction by means of a transfer algorithm. Detected objects are classified according to type and the transfer algorithm is a movement model selected to match the determined object type and according to which the object is expected to move through the gap and which comprises a probability of the object being located in the gap. The probability is calculated from location and movement variables of the vehicle and of the detected object. The probability further takes into account any features in the roadway section that may permit the object to enter and/or exit the roadway directly into/out of the detection gap.

16 Claims, 3 Drawing Sheets

(58) Field of Classification Search
CPC .. B60Q 9/008; B60T 2201/024; B60W 30/09; B60W 30/095; B60W 50/04; B60R 2300/802
USPC .......................................................... 340/435
See application file for complete search history.

(56) References Cited

U.S. PATENT DOCUMENTS

| | | | | |
|---|---|---|---|---|
| 2008/0300755 | A1* | 12/2008 | Madau | B60R 1/00 701/49 |
| 2010/0073480 | A1* | 3/2010 | Hoek | G01P 1/08 348/148 |
| 2010/0117813 | A1* | 5/2010 | Lee | B60W 40/04 340/435 |
| 2012/0218093 | A1* | 8/2012 | Yoshizawa | B60R 1/00 340/435 |
| 2013/0293395 | A1* | 11/2013 | Ohama | G08G 1/16 340/904 |

OTHER PUBLICATIONS

JP 2014-222462, Minemura Akinori, May 14, 2013, Denso Corp, p. 1-8.*

* cited by examiner

METHOD FOR LOCATING AN OBJECT IN A BLIND-SPOT OF A VEHICLE

CROSS-REFERENCE TO RELATED APPLICATIONS

This application claims foreign priority benefits under 35 U.S.C. §119(a)-(d) to DE 10 2014 205 014.6 Mar. 18, 2014, which is hereby incorporated by reference in its entirety

TECHNICAL FIELD

The invention relates to a method and an apparatus for detecting moving objects in the area surrounding a vehicle, and to a method and apparatus for predicting the presence of such objects when they are in a blind-spot between detection zones of a vehicle sensor system.

BACKGROUND

Driver assistance systems, such as lane change assistants for example, require sensor detection and identification of objects in the area surrounding the vehicle. The sensors are often designed for an entire family of vehicles or assistance systems and usually do not allow an all-round view; rather, there are detection gaps, also called blind-spots at one or more locations around the vehicle.

Many vehicles with driver assistance systems have only a front radar and/or a front camera and a rear radar. In this case, large regions to the left and right of the vehicle remain unobserved by the sensors. Therefore, by way of example, an overtaking vehicle would disappear from the detection zone of a rear radar, moving into the coverage gap, and reappear in the detection zone of a front radar some time later.

U.S. Pat. No. 8,493,195 B2 discloses a method and an apparatus in which detection gaps between the detection zones of sensors are bridged by a prediction, taking into consideration the relative speed between the first-party vehicle and the observed target vehicle. As long as a target vehicle is obviously in a detection gap, a warning is output in the first-party vehicle. The warning is ended when the target vehicle is not detected again in the expected location after a predicted period of time has elapsed.

DE 10 2011 010 864 A1 discloses a method and an apparatus for predicting collisions between a motor vehicle and objects in the area surrounding said motor vehicle, in particular pedestrians and cyclists in blind-spot regions of the sensors, with collision probabilities not being determined on the basis of linear movement models, but rather on the basis of stochastic attainability values. No interpolation takes place in regions which cannot be observed.

SUMMARY

According to the invention, detected objects are classified according to type, specifically the type of road user, in particular motor vehicle, cyclist or pedestrian. A movement model matched to the determined object type is selected and assigned to the object, the object being expected to move through a detection gap according to said movement model. The movement model comprises a location probability of the object at its locations in the movement model, with the location probability being calculated from location and movement variables of the vehicle and of the detected object, also taking into account information about features in the geometry or layout of the currently-travelled section of roadway.

In a situation in which, for the currently-travelled roadway section, there is a possibility of a detected object (after having been assigned a movement model) and enters a detection gap departing from the roadway without being identified, in particular in the case of a branching carriageway, such as the turn-off lane of a freeway exit ramp for example, the location probability in the movement model that this object is located in the detection gap can be reduced.

In a situation in which, for the currently-travelled roadway section, there is a possibility of an object which has not previously been detected by the vehicle sensors entering a detection gap without being identified, in the case of a roadway junction or a freeway entrance ramp for example, a movement model with a gap probability greater than zero is created for a potential object of this kind.

In a preferred embodiment, the gap probabilities of objects which are not detected or are no longer detected tend to be reduced gradually as time and/or distance passes and are finally set to zero depending on the elapsed time and/or the distance covered unless, on account of the situation in the surrounding area, there is no possibility of this object having departed from the detection gap without being detected.

The information about exit/entry features in the roadway section can be obtained from map data and/or sensor data, for example from digital maps in a vehicle navigation system and/or from images on digital cameras as sensors of the vehicle.

The moving objects are normally other road users, in particular motor vehicles, cyclists and pedestrians, and the movement variables of the vehicle and of the moving objects may be positions, speeds and accelerations in two or three dimensions in space.

Detected objects are classified by type, this allowing a movement model which matches the object to be initialized and formed. The objects are not simply transferred, but rather the location and movement variables of the classified objects are modeled and stored in a "memory" which forgets the objects again when the gap probability drops below a limit. This memory is additionally coupled to map data or other information about features of the roadway currently being driven which, for example, appear to make it possible for the object to exit the detection gap without further detection, or for a new object (for example on a freeway entrance ramp) to appear in regions which are not detected by sensors. The objects in the detection zones are initially tracked by a filter, and the model is also initialized or adapted to match the object in a suitable manner there. The same algorithm then continues to run when the object passes into a detection gap. The difference in detection gaps is only that the sensor data is missing and the algorithm has to rely on its movement model (that is to say pure extrapolation or prediction takes place). In the observed zone however, filtering takes place, that is to say, in addition to prediction, the filter can further use the measurement data in order to describe object movements.

In one aspect of the disclosed method, movement models of objects around the vehicle are formed. Each movement model is updated "online" in the zones which are detected by sensors and used "offline" (in a purely predictive manner) in the regions which are not detected by sensors, in order to extrapolate the location and movement variables and therefore to continue to track the associated object. Since this tracking in the regions which cannot be observed is a pure prediction, the unreliability component for each prediction step (for each unit of time) increases and at some point becomes so inaccurate that expedient tracking is no longer worthwhile, and therefore an object of this type can be "forgotten", that is to say deleted from the memory.

There now follows a description of exemplary embodiments with reference to the drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
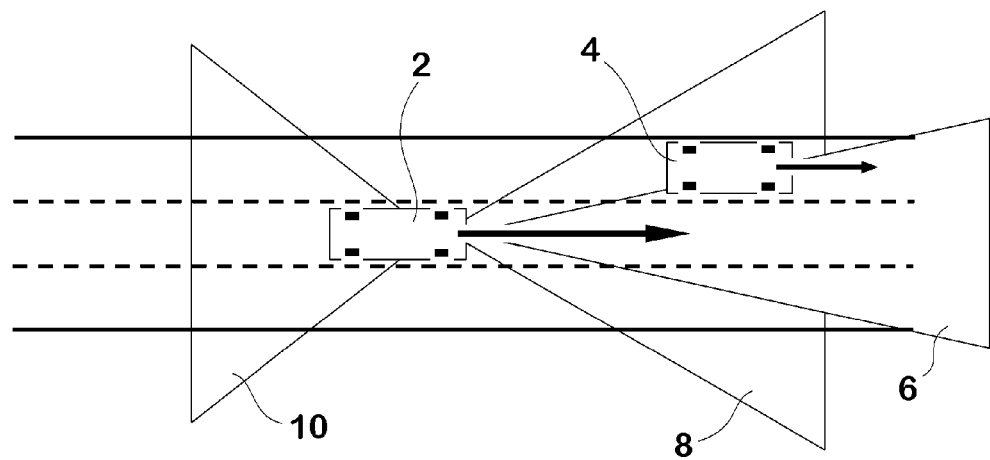
FIG. 1 shows a first motor vehicle overtaking a second motor vehicle traveling in front and in an adjacent lane on the left-hand side and detecting said second motor vehicle using the front sensor system.

FIG. 1 schematically shows a typical driving situation on a three-lane freeway. In this case, a freeway is to be understood to mean any road which has several lanes and is similar to a freeway.

A first motor vehicle, called first-party vehicle 2 in the text which follows, is traveling in the middle lane and is overtaking a second motor vehicle, called third-party object 4 in the text which follows, traveling in front in the lane on the left-hand side from the rear. The directions of travel and speeds of the two vehicles are indicated by arrows of corresponding length.

The first-party vehicle 2 has a front sensor system, in this case a front camera and/or a front radar, the third-party object 4 being covered by the typical detection zones 6, 8 of said front sensor system, and also has a rear sensor system, for example a rear camera and/or a rear radar, with a typical detection zone 10.

The third-party object 4 is detected in the first-party vehicle 2 and classified according to type, in this case as a motor vehicle. Other type classifications may include, for example, cyclists and pedestrians. The classification can be performed, for example, on the basis of the size of the third-party object 4, however, for example, a plausibility check on the basis of the speed and/or acceleration of said third-party object may also be performed.

A movement model which matches the determined object type is selected, and movement variables which are estimated on the basis of the sensor data are based on said movement model. In particular, the sensor data provides lateral and longitudinal distances between the vehicles 2 and 4 and also lateral and longitudinal relative speeds and possibly accelerations between the vehicles 2 and 4. Therefore, movements of the third-party object 4 could, in principle, be modeled in the coordinate system of the first-party vehicle 2, however it may be advantageous, where possible, to do this in a fixed base coordinate system which is attained by means of the movement of the first-party vehicle 2 itself which can be obtained from other vehicle systems.

The selected movement model is applied with input movement variables to the third-party object 4. As long as the third-party object 4 is in at least one of the detection zones 6, 8 of the first-party vehicle 2, the positions, speeds and possibly accelerations of the third-party object 4 obtained from the sensor system are input into the movement model and are updated continuously over time.

Figure 2:
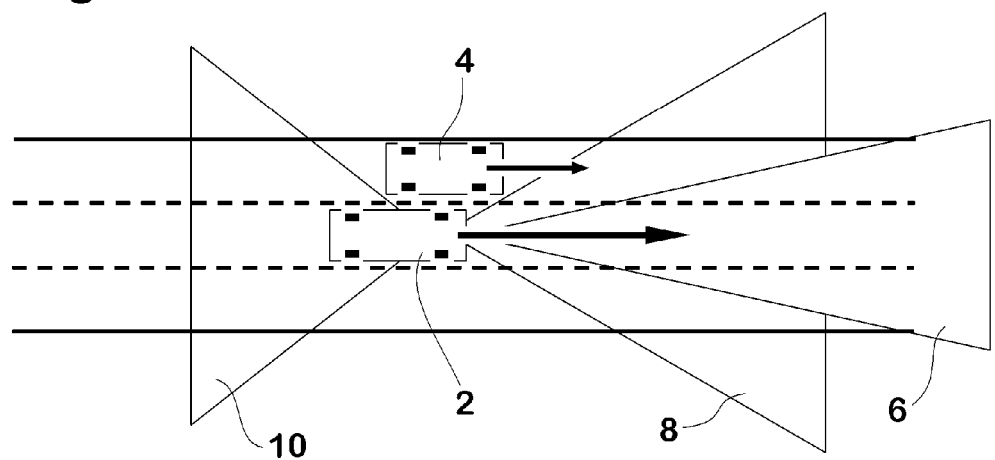
FIG. 2 shows the situation of FIG. 1 when the second motor vehicle is in a blind-spot of the sensors of the first motor vehicle.

If the two vehicles 2 and 4 in FIG. 1 continue to move at the speeds indicated by the length of the arrows so that vehicle 2 passes beside object 4, the third-party object 4 at some point departs from the two detection zones 6, 8 of the front sensor system of the first-party vehicle 2 and enters a detection gap between the forward detection zones 6, 8 and rear detection zone 10 and so cannot be detected by the rear sensor system of said first-party vehicle either, as shown in FIG. 2. In these detection gaps, the movement model provides the position of the third-party object 4 on the basis of its last-known speed.

Figure 3:
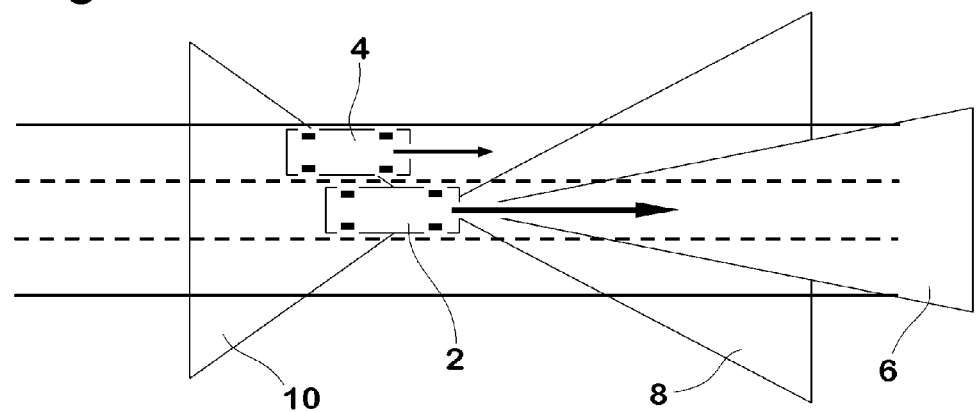
FIG. 3 shows the situation of FIG. 1 when the second motor vehicle is detected by the rear sensor system of the first motor vehicle.

If the first-party vehicle 2 continues to travel faster than the third-party object 4, the third-party object 4 enters the detection zone 10 of the rear sensor system of the first-party vehicle 2, as shown in FIG. 3, and the rear sensor system now provides data in order to again update the positions, speeds and possibly accelerations of the third-party object 4 which are input into the movement model and therefore obtained.

A similar situation occurs if, conversely, the third-party object 4 overtakes the first-party vehicle 2, with the third-party object 4 first entering the detection zone 10 of the rear sensor system of the first-party vehicle 2, then departing from said rear detection zone and entering a detection gap, and then entering the detection zones 6, 8 of the front sensor system of the first-party vehicle 2.

The positions of the third-party object 4 in its movement model are each provided with a gap probability which is determined taking into account information about any features in the currently-travelled section of the roadway that may permit an object to enter or exit the roadway. Map data of the route section in FIGS. 1 to 3 provides the information that there are no such features, in particular no turn-off, exit ramp, or junction in this section. As an alternative, this information can be acquired, for example, from images from digital front cameras with detection range 6 and/or 8.

Since the third-party object 4 cannot depart from the freeway in the route section under consideration in accordance with the circumstances, the gap probability of said third-party object, that is to say the probability that the object is located in the gap and therefore will sooner or later be detected again by the sensor system of the first-party vehicle 2, is set to the value 1.

Figure 4:
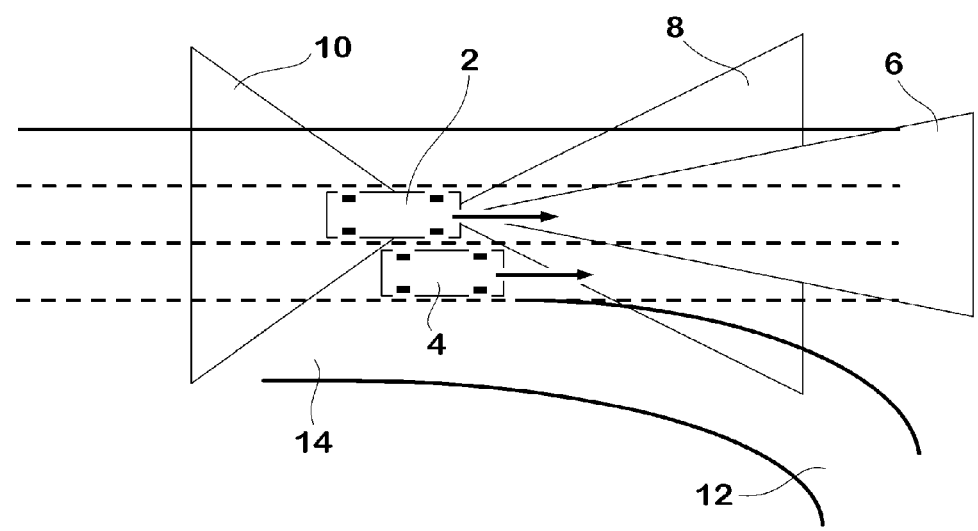
FIG. 4 shows a first motor vehicle having a second motor vehicle in an adjacent lane on the right-hand side, said second motor vehicle being in a blind-spot of the sensors of the first motor vehicle.

FIG. 4 shows a situation in which the first-party vehicle 2, as in FIGS. 1 to 3, is traveling in the middle lane of three regular lanes, but with a third-party object 4 (a motor vehicle in the described example) traveling slower in the adjacent lane on the right-hand side and in the blind-spot of the sensor system of the first-party vehicle 2. This route section contains the feature of an exit ramp 12 by means of which the third-party object 4 may possibly depart from the freeway. In this case, the probability of the third-party object 4 being in the gap, which had the value 1 up until this point, is reduced to a suitable value between 0 and 1.

The exact value of the gap probability can be defined as a function of further situation features. For example, if the third-party object 4 was previously already located in a turn-off lane 14 to the exit 12, it is more likely that the third-party object 4 is leaving the freeway than if it was previously located in a regular lane. In such a situation, the probability would be adjusted downward.

If the third-party object 4, in a situation as in FIG. 4, is still not yet detected by the first-party vehicle 2 after a certain time or distance travelled, the gap probability of the third-party object 4 is further reduced and finally set to 0, its movement model also ending at this point. That is to say, a decision is made that the third-party object 4 has departed from the freeway.

In another possible situation, not illustrated, for the current roadway section, there is a possibility of a third-party object entering a detection gap of the first-party vehicle without first being detected by the sensor system. This may occur, for example in the case of a carriageway junction, such as the acceleration lane of a freeway entrance. In such a case, a movement model with a gap probability which is greater than zero is created for a potential or inferred third-party object of this kind. So long as the potential object is not detected by sensors of the first-party vehicle the position, speed and possibly acceleration in the movement model may be selected such that the potential third-party object is assumed to remain on next to the first-party vehicle 2 in the detection gap in the acceleration lane.

The assumed gap probability of the potential third-party object is also reduced with the passage of time and/or distance and finally set to zero, its movement model also ending at this point. That is to say, a decision is made that there is no third-party object 4 traveling on the freeway.

Figure 5:
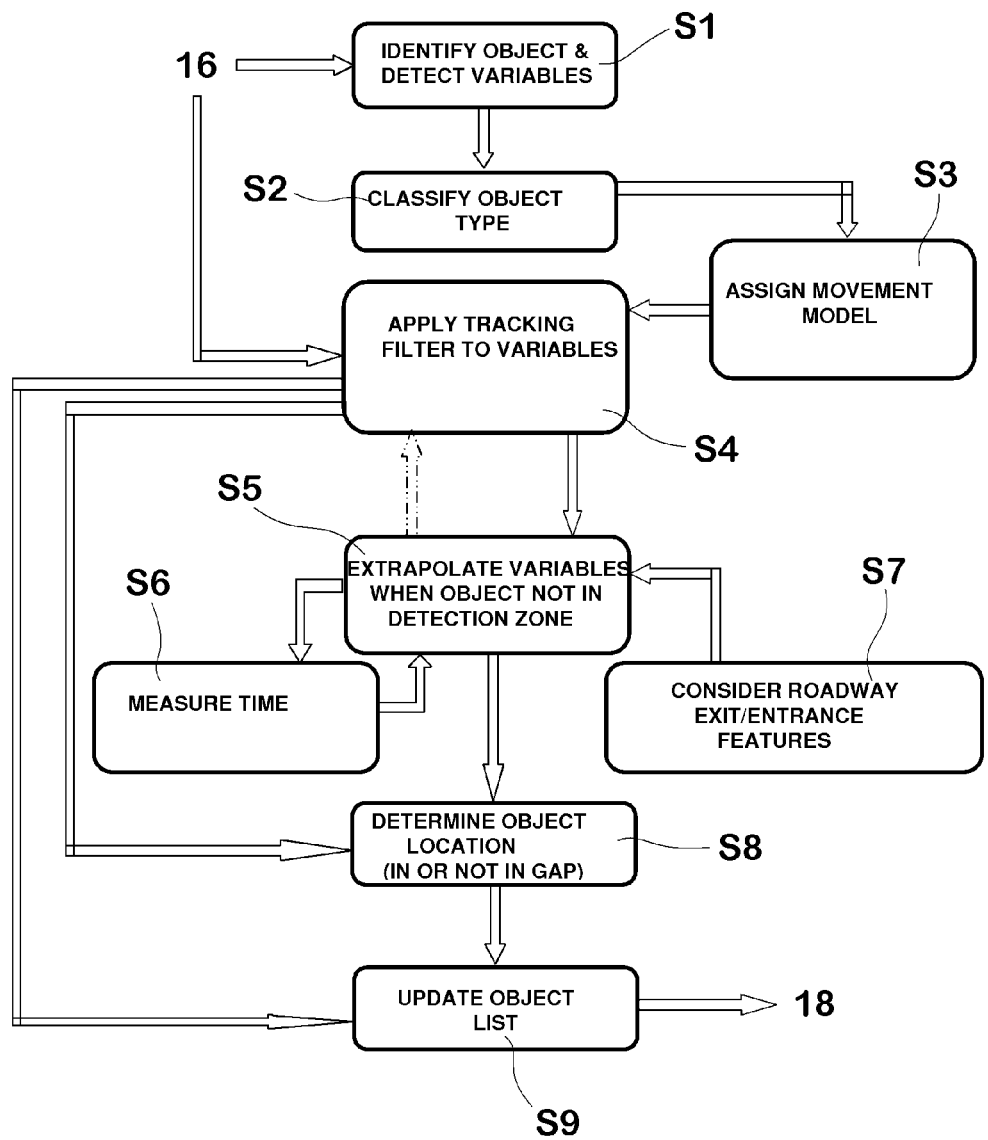
FIG. 5 shows a flowchart of a method for detecting and processing moving objects in the area surrounding a motor vehicle.

FIG. 5 shows a detailed flowchart of a method, carried out in the first-party vehicle 2 of FIGS. 1 to 4, for detecting third-party objects 4 in the area surrounding the first-party vehicle 2 by means of a sensor system which has blind zones, such as blind-spots for example.

In a step S1, a surrounding area is identified and an object is identified on the basis of the sensor system data 16. In a step S2, objects which are identified as third-party objects are classified according to type. In a step S3, a suitable movement model is selected from a number of stored movement models, which are in each case typical of motor vehicles, cyclists and pedestrians, for each identified and classified object on the basis of the classification.

Provided that the objects remain in the detection zone of the sensor system, the location and movement variables (that is to say the position, speed and possibly acceleration) of said objects are tracked and filtered. To this end, an object tracking filter combines the location and movement variables with the sensor system data 16 in step S4 in order to optimize the location and movement variables at least in a two-dimensional space. The object tracking filter may be, for example, a Kalman filter in the "closed control loop" operating mode.

If an object disappears from the detection zone of the sensor system in any direction other than into a detection gap, that is to say merely out of the range of said sensor system, this object is deleted from an object list. This case is indicated by the arrow extending directly from S4 to S9.

If an object disappears from the detection zone of the sensor system in a direction of a blind-spot, such that there is no longer any sensor system data relating to this object, the filter algorithm decides that the path of the object has led into a detection gap and whether it should be tracked or not.

If the filter algorithm in step S4 indicates that the object is likely to have moved into a detection gap, that is to say is still in the vicinity of the first-party vehicle 2, the last known location and movement variables of said object are extrapolated in step S5. The same Kalman filter as in step S4 can be used for this purpose, however in the "open control loop" operating mode.

Owing to white noise in the movement model of the Kalman filter, the location and movement variables of the object drift apart such that there are ever larger regions of the possible location and movement variables of the object. Therefore, the object can be effectively tracked only for a certain length of time while the object is in the detection gap. The time which has elapsed since the object disappeared is measured with a timer in step S6, and this object is deleted from the object list as of a certain time. The certain time can be fixedly preset or, for example, defined as a function of the speed of the first-party vehicle 2.

During the extrapolation of the location and movement variables of the object in step S5, data related to the physical features (layout) of the roadway, which may be obtained from a vehicle navigation system for example, is also taken into account. To this end, any pertinent features in the layout of the current roadway location of the first-party vehicle are then analyzed in step S7 in order to determine whether it is possible for an object to newly join the roadway or depart from said roadway.

If an object which is already tracked by extrapolation could depart from the freeway in this route section without being detected by the sensor system, a gap probability of the object, which had, for example, the value 1 up until this point, is reduced.

If any object in this route section could join the freeway without being detected by the sensor system because it is in a blind-spot of said sensor system, a new, potential object with a certain gap probability between 0 and 1 is generated and tracked.

In both cases, the gap probability of the known or potential object in a detection gap is reduced over time, and the object is finally deleted from the object list.

Objects which return to the detection zone of the sensor system from blind-spots are treated as "known objects" since they have already been classified and have obtained a movement model. The tracking mode of operation of said objects changes from "open control loop" to "closed control loop", as indicated by a dashed arrow extending from S5 to S4 in FIG. 5, since the sensor system data which is available again can be used to update the location and movement variables of said object.

Using the extrapolated location and movement variables obtained in step S5, the position of each object is determined in step S8. Subsequently, in step S9, an object list of all of the objects around the first-party vehicle 2 is updated and, in the above-mentioned cases, objects are deleted from said object list. The object list is output to a driver assistance system 18.

The driver assistance system 18 can be, for example, a lane change assistant, but also, for example, a system/device for automatic emergency evasion maneuvers, with the described method being able to prevent an automatic evasion maneuver leading into unobserved regions in which there may be another vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a driver assistance system of a vehicle travelling on a roadway comprising:
    operating a vehicle-mounted sensor system to determine location and movement variables of an object, the sensor system having two detection zones separated by a gap;
    assigning a movement model to the object;
    updating the movement model using the location and movement variables from the sensor system while the object remains in one of the detection zones;
    when the object moves out of the detection zones, assessing a probability that the object is in the gap using the movement model and using roadway features by which the object may exit the roadway; and
    affecting a vehicle system in response to the probability.

2. The method of claim 1, wherein the movement model is assigned to the object based on a classification of the object determined by data from the sensor system.

3. The method of claim 2, wherein the object is classified as one of a motor vehicle, a cyclist, and a pedestrian.

4. The method of claim 1, wherein the vehicle system is a lane change assistant.

5. The method of claim 1, wherein the probability is reduced depending on elapsed time and/or distance covered after the object moves out of the detection zones.

6. A method of operating a driver assistance system of a vehicle travelling on a roadway comprising:
    operating a vehicle-mounted sensor system to determine location and movement variables of an object, the sensor system having two detection zones separated by a gap;
    classifying the object as a type of road user based on data from the sensor system
    assigning a movement model to the object, the movement model matched to the type of road user;
    updating the movement model using the location and movement variables from the sensor system while the object remains in one of the detection zones;
    when the object moves out of the detection zones, extrapolating the location and movement variables to assess a probability that the object is in the gap;
    adjusting the probability if the roadway has a feature by which the object may exit the roadway without leaving the gap; and
    affecting a vehicle system in response to the probability.

7. The method of claim 6, wherein the object is classified as one of a motor vehicle, a cyclist, and a pedestrian.

8. The method of claim 6, wherein the vehicle system is a lane change assistant system.

9. The method of claim 6, wherein the probability is reduced depending on elapsed time and/or distance covered by the vehicle after the object moves out of the detection zones.

10. A method comprising:
    assessing a probability that an object is in a gap between detection zones of a vehicle sensor system using a movement model assigned to the object based on object location and movement variables detected by the sensor system and a roadway feature allowing the object to exit the roadway, the model being updated while the object remains in one of the zones; and
    affecting a vehicle system in response to the probability.

11. The method of claim 10, wherein the movement model is assigned to the object based on a classification of the object determined by data from the sensor system.

12. The method of claim 11, wherein the object is classified as one of a motor vehicle, a cyclist, and a pedestrian.

13. The method of claim 10, wherein when the roadway feature allows the object to exit the roadway while in the gap, the probability is reduced.

14. The method of claim 10, wherein the probability is reduced depending on an elapsed time that the object is not detected by the sensor system.

15. The method of claim 10, wherein information related to the roadway feature is obtained from a vehicle navigation system data.

16. The method of claim 10, wherein the vehicle system is a lane change assistant.

* * * * *